(12) United States Patent
Bruski et al.

(10) Patent No.: US 8,290,755 B2
(45) Date of Patent: Oct. 16, 2012

(54) SYSTEM FOR TESTING AT LEAST ONE ELECTRONIC CONTROL UNIT AND METHOD

(75) Inventors: Nicola Bruski, Paderborn (DE); Ralf G Boerger, Paderborn (DE); Robert Leinfellner, Paderborn (DE); Eduard Miller, Salzkotten (DE); Thomas Woelfer, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 631 days.

(21) Appl. No.: 12/142,208

(22) Filed: Jun. 19, 2008

(65) Prior Publication Data

US 2008/0319728 A1  Dec. 25, 2008

(30) Foreign Application Priority Data

Jun. 22, 2007  (DE) .......................... 10 2007 029 285

(51) Int. Cl.
*G06F 7/60* (2006.01)
*G06F 17/10* (2006.01)

(52) U.S. Cl. ................................. 703/2; 703/13; 700/29

(58) Field of Classification Search ................ 703/2, 23, 703/13; 700/24, 29; 711/200
See application file for complete search history.

(56) References Cited

U.S. PATENT DOCUMENTS 6,219,628 B1 * 4/2001 Kodosky et al. ................. 703/2
6,766,514 B1  7/2004 Moore 2008/0065239 A1  3/2008 Leinfellner et al.
2008/0162069 A1  7/2008 Bruski et al.
2008/0183456 A1  7/2008 Bruski et al.

FOREIGN PATENT DOCUMENTS

| DE | 10 2004 027 033 A1 | 10/2005 |
| EP | 1898282 A | 3/2008 |
| EP | 1936452 A | 6/2008 |
| WO | WO 2005/091089 A | 9/2005 |

OTHER PUBLICATIONS

Extended European Search Report for EP08104497.6, dated Oct. 17, 2008 (with translation of Examiner's Notes) 8 pages.
German Search Report dated Oct. 28, 2010 (with English language machine translation).
Real-Time Digital Simulation Of Electromagnetic Transient Phenomena in Power Transmission Lines, J. Parle et al., Proceedings of the 4th International Conference on Advances in Power System Control, Operation and Management APSCOM-97, Hong Kong, Nov. 1997, pp. 563-568.

* cited by examiner

*Primary Examiner* — Kandasamy Thangavelu
*Assistant Examiner* — Luke Osborne
(74) *Attorney, Agent, or Firm* — Orrick Herrington & Sutcliffe, LLP

(57) ABSTRACT

The present invention relates to a test device for testing a control system and an associated method for operating the test device. The test device includes an addressable memory. The test device is configured to calculate at least one environment model and to execute at least one test model. The environment model is described by environment model variables whose values are filed at fixed physical addresses in memory locations of the memory. The test device further comprises an allocation unit, in which the allocation of all or a part of the environment model variable to the allocated physical addresses of the memory is filed such that the test model can read the allocation of the environment model variables to their specific memory addresses so as to modify the environment model variable values in the environment model during its execution.

14 Claims, 3 Drawing Sheets

SYSTEM FOR TESTING AT LEAST ONE ELECTRONIC CONTROL UNIT AND METHOD

This application claims priority to German Application No. 10 2007 029 285.8 entitled "Testvorrichtung zum Testen wenigstens eines elektronischen Steuerungssystems sowie Verfahren zum Betreiben einer Testvorrichtung" filed in the German Patent Office on Jun. 22, 2007, which is herein incorporated by reference.

The invention relates to a test device for testing at least one electronic control system, in particular a control device, which is used in vehicular technology, in particular automotive engineering. Furthermore, the invention relates to a method for operating a test device.

The test device is suitable and configured to be connected to the control system, which is to be is tested, by means of a data channel. In addition, the test device calculates an environment model, and at least one test model can be executed. During the execution the environment model can interact with the control system by means of the data channel by outputting environment model data to the control system and by accepting control system data from the control system. The test model can be designed for influencing the environment model, for influencing the calculation of the environment model, and/or for influencing the electronic control system. In this case the environment model is described, inter alia, by the environment model variables, which are filed at fixed physical addresses—that is, physical addresses that cannot be changed at the run time—in memory locations of a memory of the test device. The test device is suitable and configured for modifying the environment model variables.

The European patent application bearing the application number 06 018 945.3 discloses a test device, which has the aforementioned properties. In addition, methods and devices for testing electronic control systems are known in a variety of forms from the field and are used chiefly in applied research and industrial development work in the development of electronic control systems.

In the present patent application the term "control system" is used as a comprehensive name for a technical device that in essence can fulfill the tasks of measuring, controlling, regulating and calibrating. In this case it usually involves an electronic, controllable system that is usually called a "control device" in the field of automotive engineering. The term "control system" is not restricted to what is defined in the narrow sense as an open loop control [Steuerung] within the context of system theory. Rather closed loop control [Regelung] systems are also called control systems in the field and in the language of this patent application. In particular, it must be pointed out that system theory in the English language does not usually distinguish between an open loop control [Steuerung] and a closed loop control [Regelung], as in the case of the German standards.

In the course of developing control systems that are suitable for the field and, in particular, also suitable for mass production, it is necessary or at least desirable to test the developed control system together with the real process to be controlled and/or regulated. To this end, so-called "hardware in the loop" tests (HIL test) can be executed. In the case of HIL tests with the test device, described in the European patent application bearing the application number 06 018 945.3, the developed control system is connected to a test device. Then using the environment model, the test device simulates the functional environment of the control system to be tested. Thus, the control system interacts with a virtual environment, in that the environment model, which is connected to the control system by means of the data channel, outputs the environment model data to the control system and accepts control system data from the control system. Examples of such HIL tests are disclosed in the European patent application bearing the application number 06 018 945.3.

The actual test of the control system consists of the environment model of the control system being influenced in a targeted manner specifically by the test model, which also runs on the test device. If in the past it was customary to let such test models run on a separate device, the European patent application 06 018 945.3 discloses for the first time that the test model and the environment model run on the same device—that is, on the test device. The advantage of this technical teaching, which is described for the first time in the European patent application bearing the application number 06 018 945.3, is that it enables the tests to run in real time.

Whereas in the past it was customary for the test model to run on a device that was different from the test device—namely on a so-called configuration device, which could not guarantee the capability to run in real time—it is now possible with the test device, according to the European patent application bearing the application number 06 018 945.3, to achieve that the test model and the environment model run in time synchronization.

However, this advantage of the capability to run in real time was achieved with a drawback. In the case of the prior art test devices and/or arrangements comprising test devices and configuration devices it was possible to change the parameters of the environment model—namely the so-called environment model variables—during the run time of the environment model and the test model by means of the test model—that is, from the configuration device. To this end, the test model could access immediately the environment model variables. This was possible, because the test model knew in which memory areas of the test device the environment model variables were filed. Since the physical addresses of the environment model variables on the configuration device were known, and the test model could access these variables, the test model could access the memory locations through the physical memory addresses of the environment model variables and could change the content of these memory locations, a feature that resulted in a change in the environment model variables. The memory locations of the environment model variables were known to the test model, because the environment model is usually configured and compiled on the configuration device—that is, was translated into a program that can run in machine readable code. During the process of compiling, the physical addresses of the memory locations of the environment variables were determined and recorded, and then later knowing these recordings, the test model could be developed and/or could resolve this information at the run time. To this end, the recordings of the memory locations of the environment model variables were filed on the configuration device.

Since, however, according to the technical teaching of the European patent application bearing the application number 06 018 945.3, the test model also runs on the test device and not on the configuration device, it is not possible to access the recordings of the physical memory locations of the environment model variables.

That means that the test model has to be informed of the physical addresses, at which the test model can access the environment model variables, in order to manipulate the environment model variables. This was implemented in that in setting up the test model on the configuration device, the user of the test device enters by hand the physical addresses of the environment model variables into the test model. Then the test model is adapted individually to the environment model and, in particular, in the form, in which it runs on the test device. If, on the other hand, the environment model is to run on a different platform, for example with a different type of processor or a different computer architecture, then during the compilation of the environment model, other memory areas are provided, in which the environment model variables are stored. Therefore, in the event that a is platform other than the test device is used, it is necessary to adapt the test model, in particular, the physical memory addresses of the environment model variables that are inputted into the test model. Thus, it can be observed that the process of informing the test model of the physical addresses of the memory locations of the environment variables is laborious, complicated and time-consuming and results in usable test models that exhibit too little flexibility.

At this point, the present invention starts.

The present invention is based on the problem of configuring a test device in such a manner that the test model can access the environment variables and/or the memory locations of the environment variables without the laborious manual input of physical addresses in order to change the environment variables. In this way it is possible to make available a test model that is easier to configure and more flexible to use. Furthermore, an improved method for operating a test device shall be provided. In this case the drawbacks of the state of the art shall be minimized or avoided.

The invention solves this problem in that the test device comprises a unit for allocating. The allocation of all or a part of the environment model variables, in particular the identifiers of the environment model variables, to the allocated physical addresses of the memory of the test devices is filed so as to be readable in this unit for allocating. Thus, the allocation of the memory addresses to the environment model variables and/or the identifiers is known on the test device. Therefore, it is no longer necessary to input the physical addresses into the test model; or rather it is no longer necessary that the test model knows the physical addresses. Rather it suffices if the test model knows the identifiers of the environment model variables. Then the test model can access the unit for allocating, in order to find out the physical address of a given environment model variable and/or an identifier of an environment model variable.

Furthermore, the invention solves the described problem by providing a method exhibiting the features, disclosed in patent claim 13.

Advantageous further developments of the test device, according to claim 1, and/or the method, according to claim 13, are the subject matter of the dependent patent claims.

According to the invention, the test model is advantageously suitable and configured to read out the allocation of one or more environment model variables to the allocated physical address of the memory from the unit for allocating. Furthermore, the test model is advantageously suitable and configured to change the values of the environment model variables that are stored under the physical addresses, in order to influence the environment model, in order to influence the calculation of the environment model, and/or in order to influence the electronic control system. To this end, the test model can comprise at least one function, with which one, several or all of the environment model variables can be modified. The modification of the environment model variables by means of the function can take place simultaneously. That is, the environment model variables can be changed preferably in succession, but during one cycle of the environment model. During the simulation of an environment by means of an environment model, this model is calculated cyclically as a function of the requirements placed on the experiment. This cyclical calculation of the environment model takes place, for example, in a time step of one millisecond.

However, depending on the real time requirements it may also be necessary, for example, to execute the environment model calculations in shorter cycles.

The function of the test model, with which the environment model variables can be changed, may exhibit a loop, within which the memory locations, allocated to the environment model variables, which are intended for changing the value of the environment model variables, are addressed. In other words, the test models may exhibit routines, with which a large number of the environment model variables can be addressed and changed in succession.

The environment model of the inventive test device can comprises a plurality of functions. In this case environment model variables are allocated to these functions. Furthermore, it may then be provided that the environment model variables are arranged so as to be organized, according to their allocation to the functions of the environment model, in the unit for allocating. Thus, it is possible to provide a clearer arrangement of the environment model variables and the physical addresses of the environment model variables in the unit for allocating.

Insofar as the functions of the environment model are organized in a hierarchical manner, it is possible to arrange the environment model variables so as to be organized according to this hierarchy in the unit for allocating. This feature serves to provide a better overview of the unit and the arrangement of the environment model variables and the physical addresses in the unit.

The environment model variables usually exhibit an identifier. This identifier can comprise the name of the function, which is assigned to the environment model variables. Similarly the identifier could suggest the position of the function, to which the environment model variable is allocated, in the hierarchy of the functions of the test model.

A unit for allocating involves advantageously a data file, but the use of other known methods and devices for storing digital data are also conceivable, for example the use of a database or a volatile memory.

The test model of an inventive device can be suitable and configured in such a manner that at the beginning of the run time of the test model the entries of the unit for allocating are read and filed in a memory area that is allocated to the test model. Therefore, it is possible for the test model to have immediate access to the physical addresses of the environment model variables.

Similarly the test model can be suitable and configured to read the entries of the unit for allocating during the run time and to file in a memory area that is allocated to the test model.

A test device of the invention can be combined with a configuration device and optionally with a control system to form an arrangement. At the same time the configuration device is suitable and configured for developing, changing and/or acquiring environment models and/or test models.

The arrangement may exhibit a data channel, by means of which the test device and the configuration device are connected together.

Furthermore, the configuration device can be suitable and configured to write the allocation of one or more environment model variables to the allocated physical addresses of the memory into the unit for allocating and/or to generate this unit and/or to file this unit in the test device, so that the test model can access this unit at a later time—that is, at the run time or at the beginning of the run time.

Furthermore, the configuration device can be suitable and configured to change the values of the environment model variables that are stored at the physical addresses and, in particular directly or indirectly with the intercalation of the test model, in order to influence the environment model and/or in order to influence the calculation of the environment model and/or in order to influence the electronic control system.

An embodiment for an arrangement comprising an inventive test device, a control system and a configuration device is described in detail below with reference to the drawings.

Figure 1:
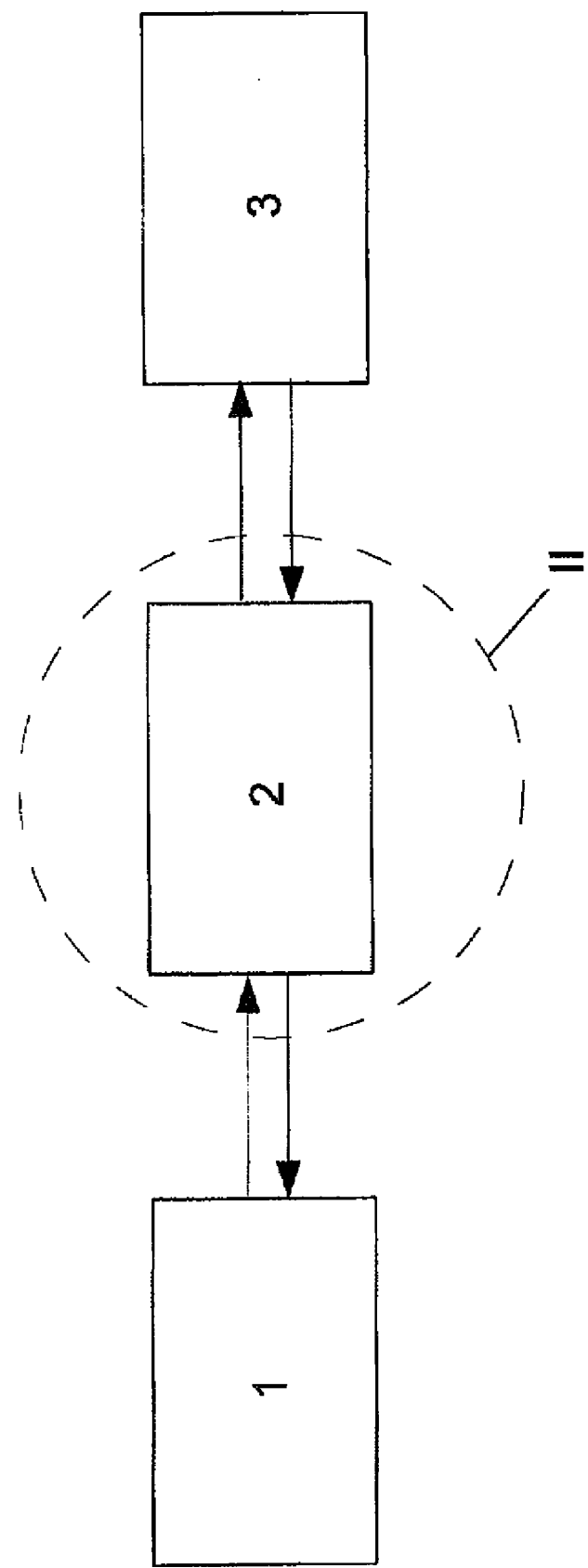
FIG. 1 is a schematic rendering of the arrangement comprising a control system, a test device, and a configuration device.
Figure 2:
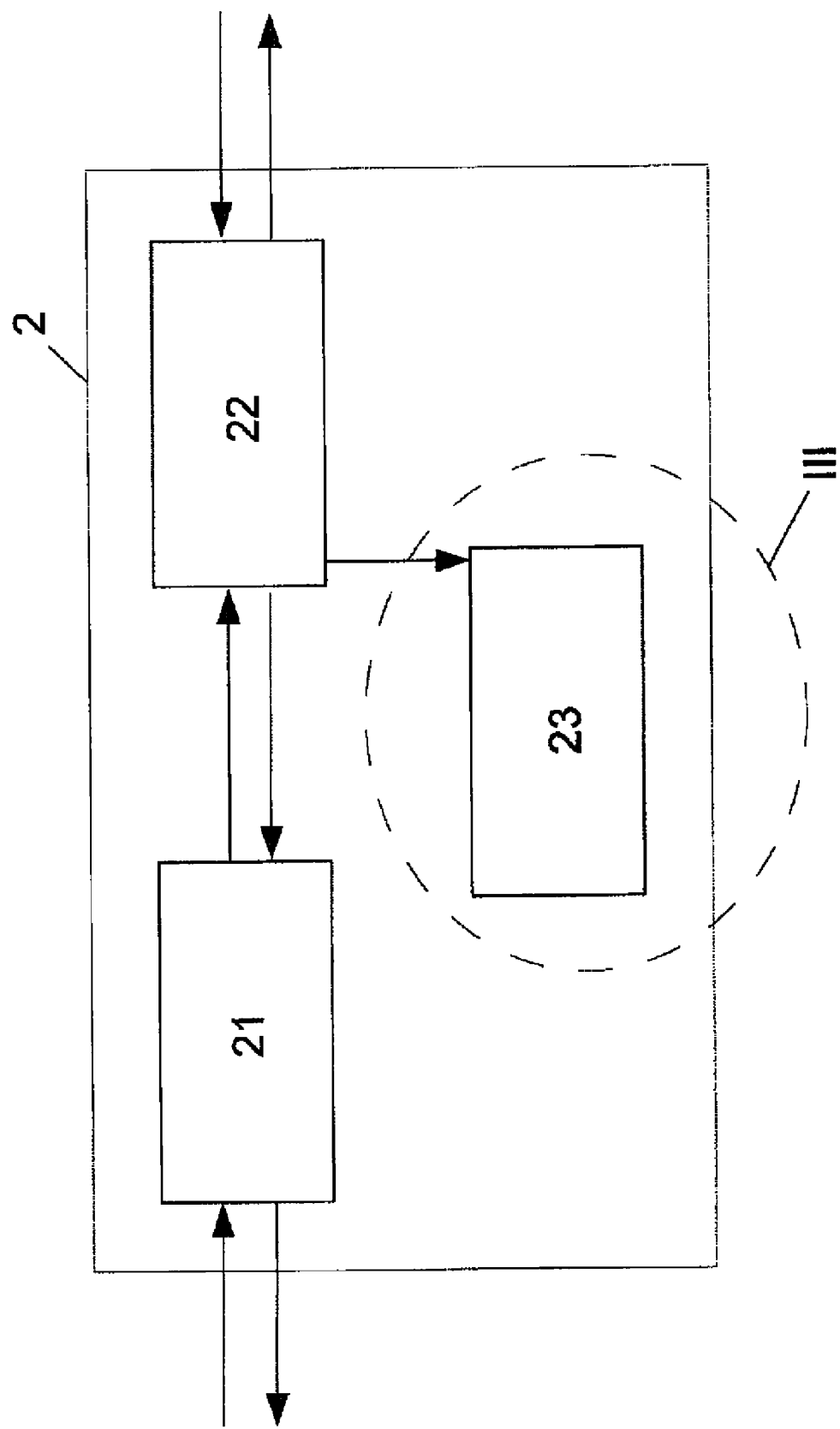
FIG. 2 is a schematic rendering of the test device.
Figure 3:
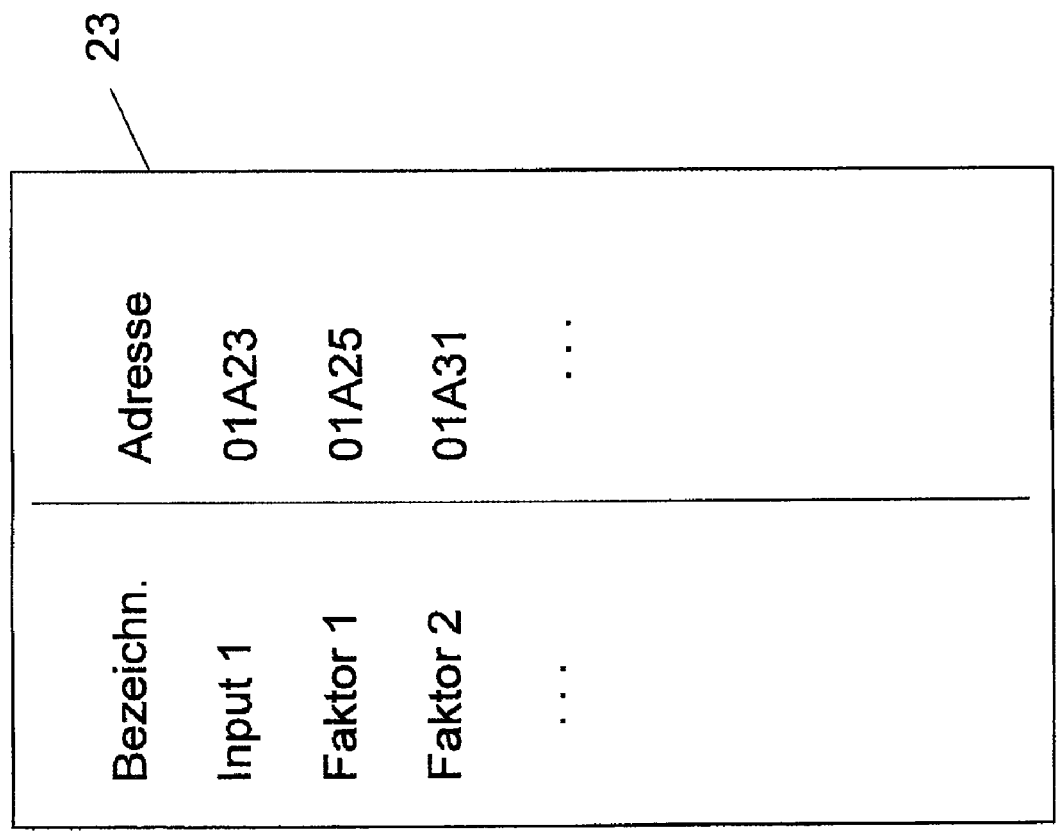
FIG. 3 depicts one example of the content of a unit for allocating.

An inventive arrangement exhibits a control system 1, a test device 2, and a configuration device 3.

The control system 1 is a control device, as used in motor vehicles. Such control devices are used, for example, to control an engine. Other control devices, such as an air conditioner control device, could also replace the control system 1. The control system 1 is to be tested with a test device 2 and is, therefore, connected to the test device 2 by means of a bi-directional interface, so that the control system data can be transferred from the control system 1 to the test device 2, and inversely the data from the test device 2 can be transferred to the control system 1.

The test device 2 is a computer, on which in essence two programs run. In this case it is a program, which constitutes an environment model 21, and a second program, which constitutes a test model 22.

The environment model 21 simulates for the control system 1 a real application environment of the control system 1. The environment model 21 presents a simulation of the real application conditions to the control system 1. These application conditions make it possible to test the control system 1 with the environment model 21. However, the actual test is not executed by the environment model 21, but rather by the test model 22. The interaction between the test model 22, the environment model 21 and the control system 1 is described in detail in the European patent application bearing the application number 06 018 945.3.

The configuration device 3, which is connected to the test device 2 by means of a bidirectional interface, forms the interface of the arrangement to the user. The configuration device 3 makes it possible for the user to have an impact on the environment model 21, the test model 22 and the test run as well as to display the test results.

First of all, the configuration device 3 has the task of developing the environment model 21 and/or of adapting an already developed environment model 21 to the control system 1 to be tested. Insofar as the environment model 21 has already been developed with suitable software, the environment model 21 is translated into a machine readable code. This code is then moved to the test device 2, where the environment model 21 is then executed at a later date.

In a very similar way the test to be conducted—that is, the test model 22—is developed or assembled on the configuration device 1. Even the test model 22 is developed with suitable software and translated into a machine readable code. This code, too, is copied to the test device 2, where the test model 22 is then executed.

In order to make it possible to change various environment model variables 21 at the run time of the environment model 21, it is provided during the compilation of the environment model on the configuration device that the physical addresses of the memory locations, in which the environment model variables are filed, are filed in a unit for allocating the variable identifiers of the environment variables to the physical memory addresses of the environment variables. This unit is created in the form of a data file on the configuration device 3. In order to enable the test model 22 to access the environment model variables and in order for the test model 22 to change these environment model variables during the run time of the test, the test model 22 has to be able to read the unit 23 for allocating the variable identifiers to the memory addresses. Therefore, according to the invention, this unit 23 for allocating has also been copied from the configuration device 3 on the test device 2. As a result, the test model 22 is able at the run time to find out the memory addresses of the environment model variables. Then the test model 22 can access immediately the values and can change these values. An information exchange between the test model 22 and the environment model 21 is not necessary in order to change the environment model variables.

As an alternative to the immediate access of the test model 22 to the stored environment model variables, it would also be conceivable in principle to file the environment model variables, including their values, in a single data file or in a plurality of separate data files. In this case both the environment model 21 and the test model 22 could access these data files with the environment model variables that are stored in said data files. Since such an access—that is, write and read access—to such environment model variables, stored in the data files, is very time consuming, the inventive procedure was chosen, in which the test model 22 can access immediately the environment model variables, which are stored in the area of the environment model 21, for manipulation.

The invention claimed is:

1. A test device for testing an electronic control system
the test device having an addressable memory, and being connected to the control system; the test device being configured to run an environment model that is described by an environmental model variable having a value that can be stored at a particular address in the addressable memory and to execute a test model,
the test device being configured such that the environment model can output environment model data to the control system and receive control system data from the control system; and,
using the environment model, the test device simulates the functional environment of the control system to be tested; and
the test model being configured to influence the environment model or the electronic control system or both the environmental model and control system,
the test device further comprising an allocating unit, in which allocation of at least one environment model variable to at least one allocated address of the memory is filed such that the test model can effect the reading of the allocation unit to determine the memory address where the environment model variable value is stored and access that memory address during execution of the test model; and
wherein the test model is configured to change the value of the environment model variable that is stored in the allocated memory address; and
wherein values of a plurality of environment model variables can be modified, during one cycle of the environment model.

2. A test device, as claimed in claim 1, comprising a loop, within which at least one memory location, allocated to the environment model variable, is addressed.

3. A test device, as claimed in claim 2, wherein the content of the addressed memory location can be changed.

4. A test device, as claimed in claim 1, wherein the environment model comprises a plurality of functions; wherein the environment model includes a plurality of environment model variables that are allocated to said plurality of functions; and wherein the environment model variables are arranged so as to be organized, according to their allocation to the functions of the environment model, in the allocating unit.

5. A test device, as claimed in claim 4, wherein the functions of the environment model are organized in a hierarchical manner, and wherein the environment model variables are arranged according to said organization in the allocating unit.

6. A test device, as claimed in claim 5, wherein the environment model variables exhibit an identifier, and wherein the identifier suggests the function, to which the environment model variable is allocated.

7. A. test device, as claimed in claim 6, wherein the identifier suggests the position of the function, to which the environment model variable is allocated, in the hierarchy of the functions.

8. A system comprising the test device of claim 7 and a configuration device, which is configured for developing, changing and/or acquiring the environment model, test model, and environment model variable and/or test model data.

9. A system, as claimed in claim 8, comprising a data channel, coupling together the test device and the configuration device.

10. A system, as claimed in claim 8, wherein the configuration device is configured to file the allocation of an environment model variable to the allocated address of the memory into the allocating unit.

11. A system, as claimed in claim 10, wherein the configuration device is configured to change the value of the environment model variable that is stored at the memory address.

12. A system, as claimed in claim 8, wherein the configuration device comprises a second allocating unit, in which an allocation of the identifier of the environment model variable, to the allocated address of the memory is stored.

13. A method for operating a test device for testing an electronic control system,
providing an integral test device,
wherein the test device includes an addressable memory,
wherein the test device is coupled to the control system, by a data channel to calculate at least one environment model and to execute at least one test model,
wherein the environment model can output environment model data to the control system and receive control system data from the control system; and,
using the environment model, the test device simulates the functional environment of the control system to be tested; and
wherein the test model is configured to influence the environment model or the control system, or both the environmental model and control system,
wherein the environment model is described by an environment model variable, which is filed at a fixed physical address in a memory location with the addressable physical memory,
wherein the test device is configurable for modifying the environment model variable, and
wherein the test device includes an allocating unit for mapping an environment model variable to its associated physical memory address comprising:
transmitting to the allocating unit at least one environment model variable and its allocated memory address;
executing the test model;
the test model effecting a reading of the allocating unit to determine the memory address of the environment model variable and a modifying of the value of the environment model variable value stored at that address for use during execution of the environment model; and
wherein the test model is configured to change the value of the environment model variable that is stored in the allocated memory address; and
wherein values of a plurality of environment model variables can be modified, during one cycle of the environment model.

14. A test device for testing a control system comprising:
a memory;
an input;
an output;
a processor in communication with the memory, the input and the output;
the processor being configured to execute an environment model defined by an environment model variable value stored in an addressable location within the memory and to output environmental model data; and
using the environment model, the test device simulates the functional environment of the control system to be tested; and
an allocation unit stored to correlate an identifier for the variable and the location in the memory storing the variable value, the allocation unit being in communication with the processor and memory;
the processor being further configurable to execute a test model and to access the allocation unit in order to modify the variable by reading the allocation unit and altering the environment model variable value stored at the memory location correlated by the allocation unit; and
wherein the test model is configured to change the value of the environment model variable that is stored in the allocated memory address; and
wherein values of a plurality of environment model variables can be modified, during one cycle of the environment model.

* * * * *